(12) United States Patent
Hillo

(10) Patent No.: US 12,540,687 B1
(45) Date of Patent: Feb. 3, 2026

(54) UNIVERSAL AUTOMATED REGULATOR VALVE WITH REMOTE MONITORING AND CONTROL

(71) Applicant: Hadi Said Hillo, Agua Dulce, CA (US)

(72) Inventor: Hadi Said Hillo, Agua Dulce, CA (US)

(*) Notice: Subject to any disclaimer, the term of this patent is extended or adjusted under 35 U.S.C. 154(b) by 0 days.

(21) Appl. No.: 17/961,334

(22) Filed: Oct. 6, 2022

Related U.S. Application Data

(63) Continuation of application No. 17/213,495, filed on Mar. 26, 2021, now abandoned, which is a continuation of application No. 15/348,703, filed on Nov. 10, 2016, now Pat. No. 10,962,133.

(60) Provisional application No. 62/255,020, filed on Nov. 13, 2015.

(51) Int. Cl.
| | |
|---|---|
| F16K 37/00 | (2006.01) |
| E03B 7/07 | (2006.01) |
| F16K 31/04 | (2006.01) |
| F17D 1/04 | (2006.01) |
| F17D 5/00 | (2006.01) |
| F17D 5/02 | (2006.01) |
| F17D 5/06 | (2006.01) |
| G08B 21/12 | (2006.01) |
| H04W 4/80 | (2018.01) |
| H04W 84/12 | (2009.01) |

(52) U.S. Cl.
CPC ............ *F16K 37/005* (2013.01); *E03B 7/071* (2013.01); *F16K 31/04* (2013.01); *F16K 31/041* (2013.01); *F16K 31/042* (2013.01); *F17D 1/04* (2013.01); *F17D 5/00* (2013.01); *F17D 5/005* (2013.01); *F17D 5/02* (2013.01); *F17D 5/06* (2013.01); *G08B 21/12* (2013.01); *H04W 4/80* (2018.02); *H04W 84/12* (2013.01)

(58) Field of Classification Search
CPC . E03B 7/071; G08B 21/20; F17D 5/02; F17D 5/005; F17D 1/04; F17D 5/06; F17D 5/00; F16K 37/0091; F16K 37/005; F16K 37/00; F16K 31/04; F16K 31/041
See application file for complete search history.

(56) References Cited

U.S. PATENT DOCUMENTS

| | | | |
|---|---|---|---|
| 6,448,958 B1* | 9/2002 | Muta | H04M 1/72415 345/169 |
| 10,962,133 B2* | 3/2021 | Hillo | F16K 31/042 |
| 2005/0072214 A1* | 4/2005 | Cooper | G01M 3/2815 73/49.1 |
| 2007/0289635 A1* | 12/2007 | Ghazarian | G01M 3/18 137/312 |
| 2017/0076563 A1* | 3/2017 | Guerriero | G06F 16/245 |

* cited by examiner

*Primary Examiner* — Atif H Chaudry

(57) ABSTRACT

A water or gas system for a home or commercial building receives water and gas at higher pressures than they can handle in the building or home. The automated regulation device monitors the regulator 24 hours a day, seven days a week so the second there is a failure with pressure, flow, temperature, seismic it recognizes it, notifies you via email, text, etc . . . shuts the system down at same time. There are gas and water sensors for leaks also there is a seismic sensor in the unit for earthquakes, and a pressure sensing switch with digital readout. The unit is capable of running by itself, on solar panel and a battery or being wired into the system dependent upon application. The unit is also controlled by user via telephone or other remote devices.

2 Claims, 14 Drawing Sheets

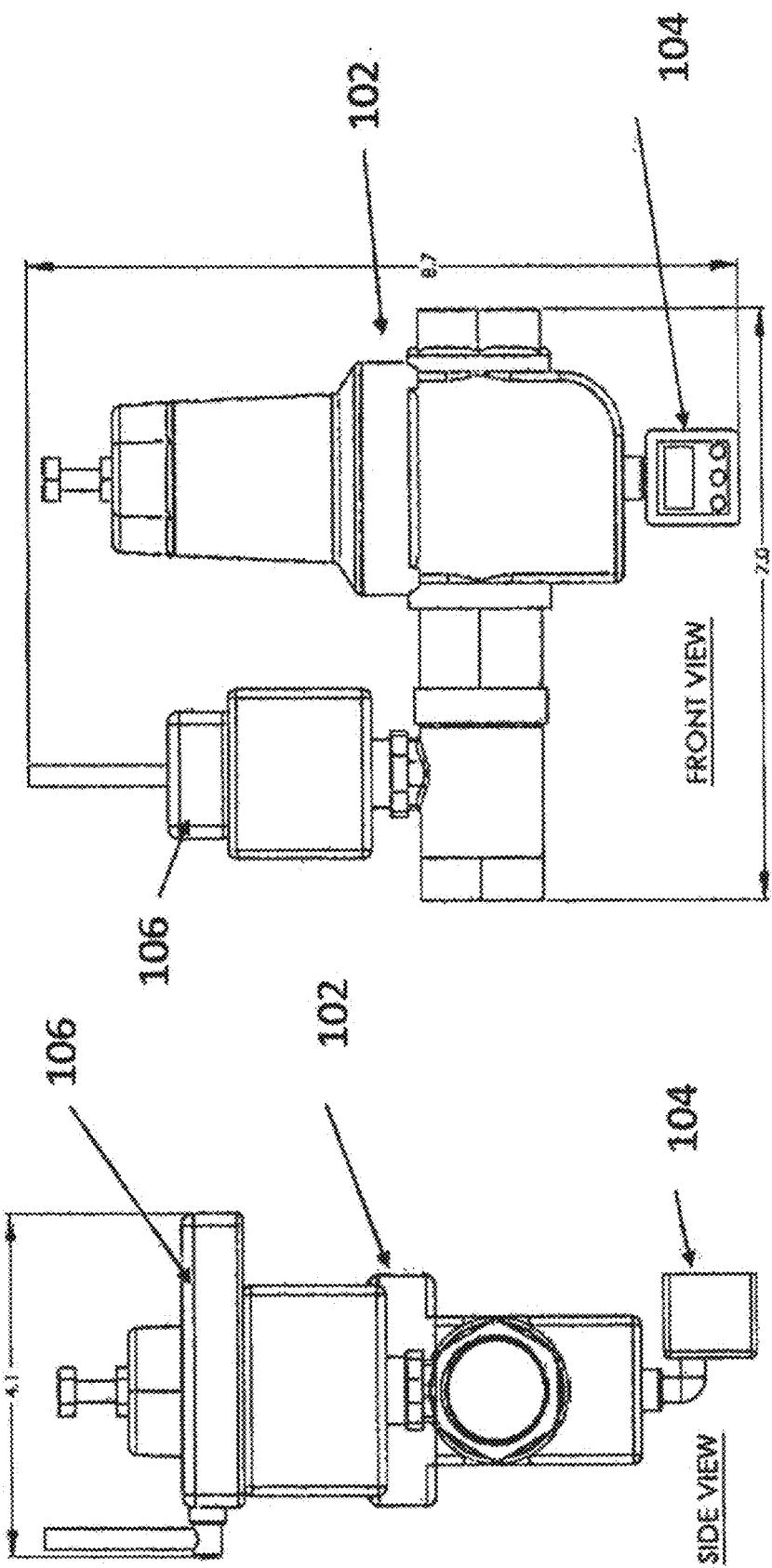

UNIVERSAL AUTOMATED REGULATOR VALVE WITH REMOTE MONITORING AND CONTROL

CROSS REFERENCE TO RELATED APPLICATIONS

This application is a continuation of U.S. Nonprovisional application Ser. No. 17/213,495, filed on Mar. 26, 2021, which is a continuation of U.S. Nonprovisional application Ser. No. 15/348,703, filed on Nov. 10, 2016, and issued as U.S. Pat. No. 10,962,133, which claims priority to U.S. Provisional Application 62/255,020 filed on Nov. 13, 2015; and this application hereby incorporates herein U.S. Nonprovisional application Ser. No. 17/213,495 and 15/348,703 and U.S. Provisional Application 62/255,020 as if set forth herein in their entireties.

TECHNICAL FIELD

The present disclosure pertains to valve control systems and particularly relates to a universal automated regulator valve constructed to maintain a set pressure and stop flow through the valve when the flow pressure is higher or lower than the set pressure.

BACKGROUND

In residential homes pressure for water and gas is set to a certain setting. Water at 80 psi or less and Gas is set at roughly 7 psi. At this time regulation devices for both water and gas or anything in regards to pressure are rubber manifolds, seals and springs that hold until the rubber fails. Universal Automated Regulator Valve with Remote Monitoring and Control is automated regulation device that controls the regulator and controls the flow of what it is regulating: water, gas etc. You are able to shut on and off via cell phone, tablet, computer it is Wi-Fi and Bluetooth capable. It is fully programmable to any parameter you set it to in regards to pressure flow. This unit also has wired and non-wired battery operated sensors for water gas etc. to be installed around the home or building it is regulating that way if there is a problem illegal of water or gas leak sensor detects it and tells the automated regulation device to shut down. It has an application via cell phone iPad and computer etc. to view pressures and monitor usage such as how much water usage you've used or how much gas you've used for monthly cycle or annually daily hourly and live feed to what's being used. The hardware that's being used to do all this automation is a Pinocchio system it's capable of solar battery operation and wired in low-voltage or high-voltage operation. You can literally use the automated regulation device without power a mile away from your farm to turn water on and off as well via Wi-Fi connecting to a water system or install it on an existing home that does not have electrical outside of the home to use a wired in unit. A wired in unit is recommended for homes in future and an existing home but battery and solar operation is capable existing regulation devices water and gas etc. are a rubber manifold only regulating pressure. We do not know when they go bad how long they last and this will give us all that information for insurance companies and other companies in the future needing information like how often there is a spike of water the Pinocchio chip is capable of telling you. The second when your regulator fails it shuts down so there is no emergency flood for emergency fire in your home because your gas regulator failed this also applies the same way with commercial buildings they have no remote control or operation in any regulation device at this time both problems and other problems are addressed in the summary below.

SUMMARY

The present disclosure relates to a universal automated regulator valve, which can be used for controlling water, gas, air, or any fluids regulated by pressure, flow, temperature, seismic electronically controlled with Pinoccio or any of the three combined or not depending upon application. The universal automated regulator valve includes an electronic actuated ball valve that is connected to an electrical motor, a relay, and the electrical pressure sensor switch. When the electrical pressure sensor $1s$ actuated, the relay goes into a closed state, and consequently the electrical motor closes the ball valve. The electrical pressure sensor switch is versatile is programmable and can control gas and liquid fluids such as water, natural gas, and air. In certain embodiments, the automated regulator valve control includes a communications device that transmits pressure reading of the electrical pressure sensor switch to a remote device (Pinoccio) which can then be controlled by cell, iPad, computer, etc. to control the electrical motor to close or open the ball valve. In other embodiments, the pressure regulator is to maintain a set pressure. Most cases below 80 psi for water and gas at roughly 7 psi as examples of pressure settings for regulators. When a predetermined level of deviation from the set pressure occurs, the ball valve is triggered to shut off flow to the valve or is user wants email and text or just email and text and not shut the valve off it is programmable to do any of them at once or any in any configuration.

BRIEF DESCRIPTION OF THE DRAWINGS

These and other features, aspects, and advantages of the present disclosure will become better understood with regard to the following description, and accompanying drawings where:

FIG. 10 is a side view of the universal automated regulator valve of FIG. 8.

FIG. 11 is a front view of the universal automated regulator valve of FIG. 8.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
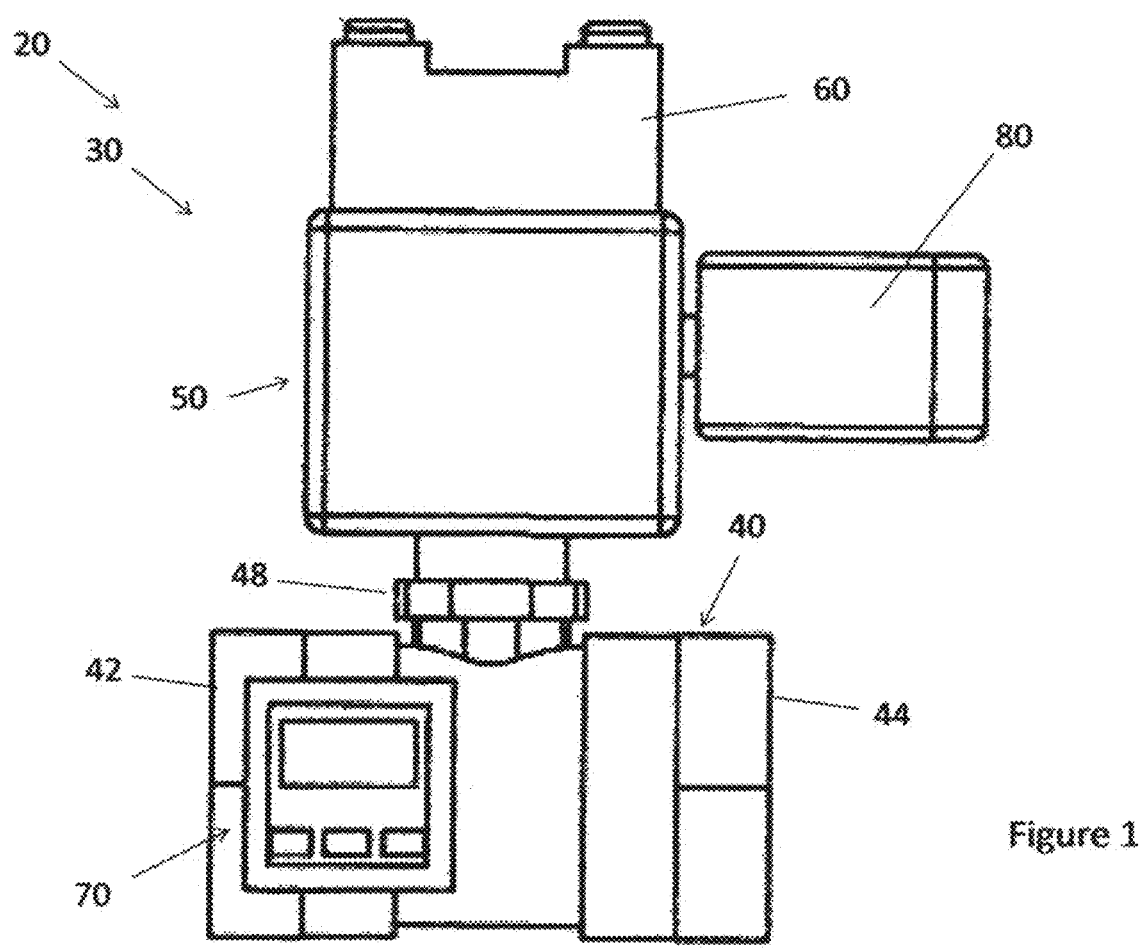
FIG. 1 illustrates an embodiment of a universal automated regulator valve without a pressure regulator attached.
Figure 2:
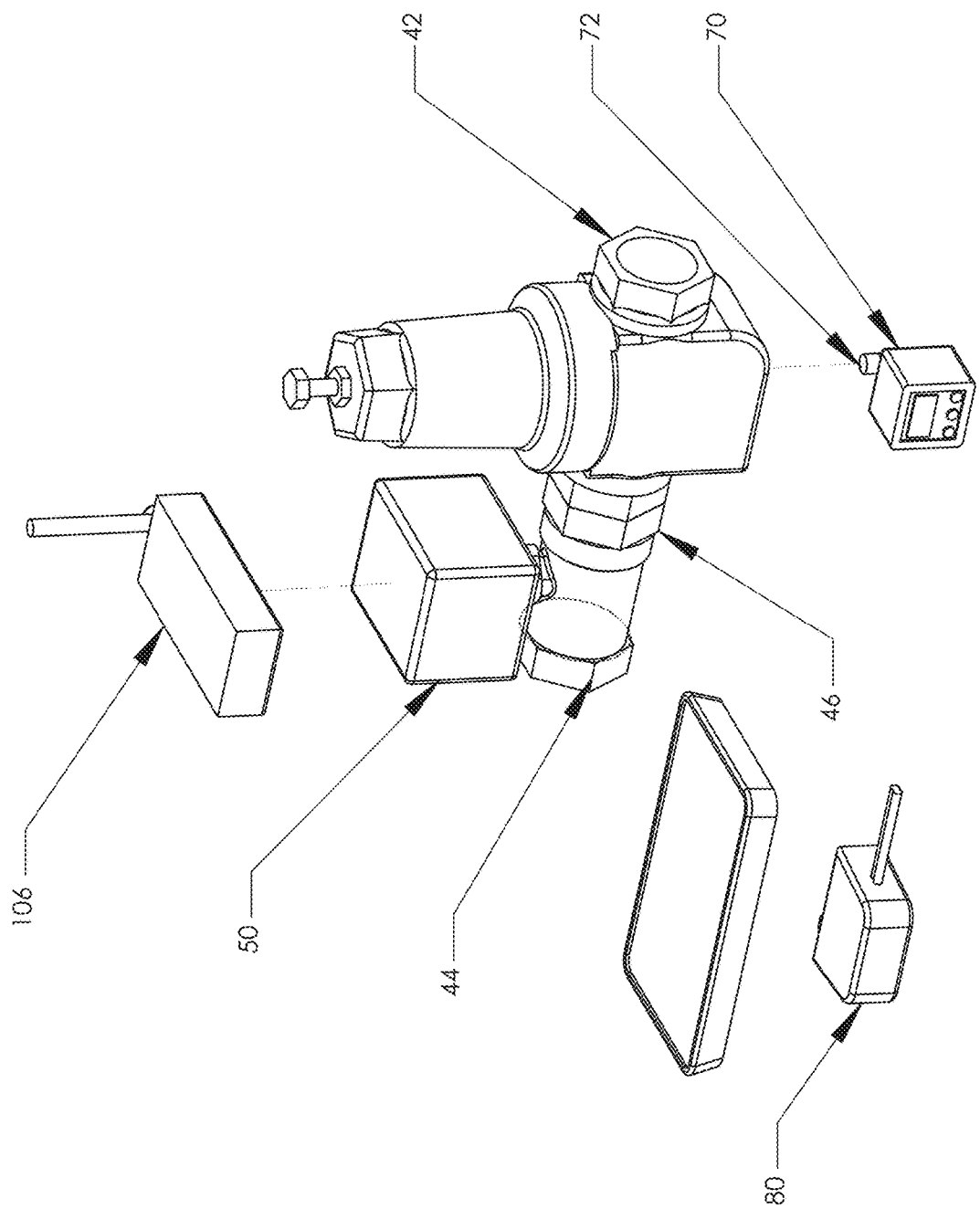
FIG. 2 is an exploded view of the device of FIG. 1.

FIGS. 1 and 2 show an embodiment of a universal automated regulator valve 20. The universal automated regulator valve 20 comprises an electronic actuated ball valve 30, an electrical pressure sensor 70, and a power supply switch 80. The electronic actuated ball valve 30 includes a ball valve 40, an electrical motor 50, and a relay 60. The electronic actuated ball valve 30 and the electrical pressure sensor 70 are wired together to a source of electrical power inside the power supply switch 80. An exemplary wiring diagram is shown in FIG. 2.

Figure 15:
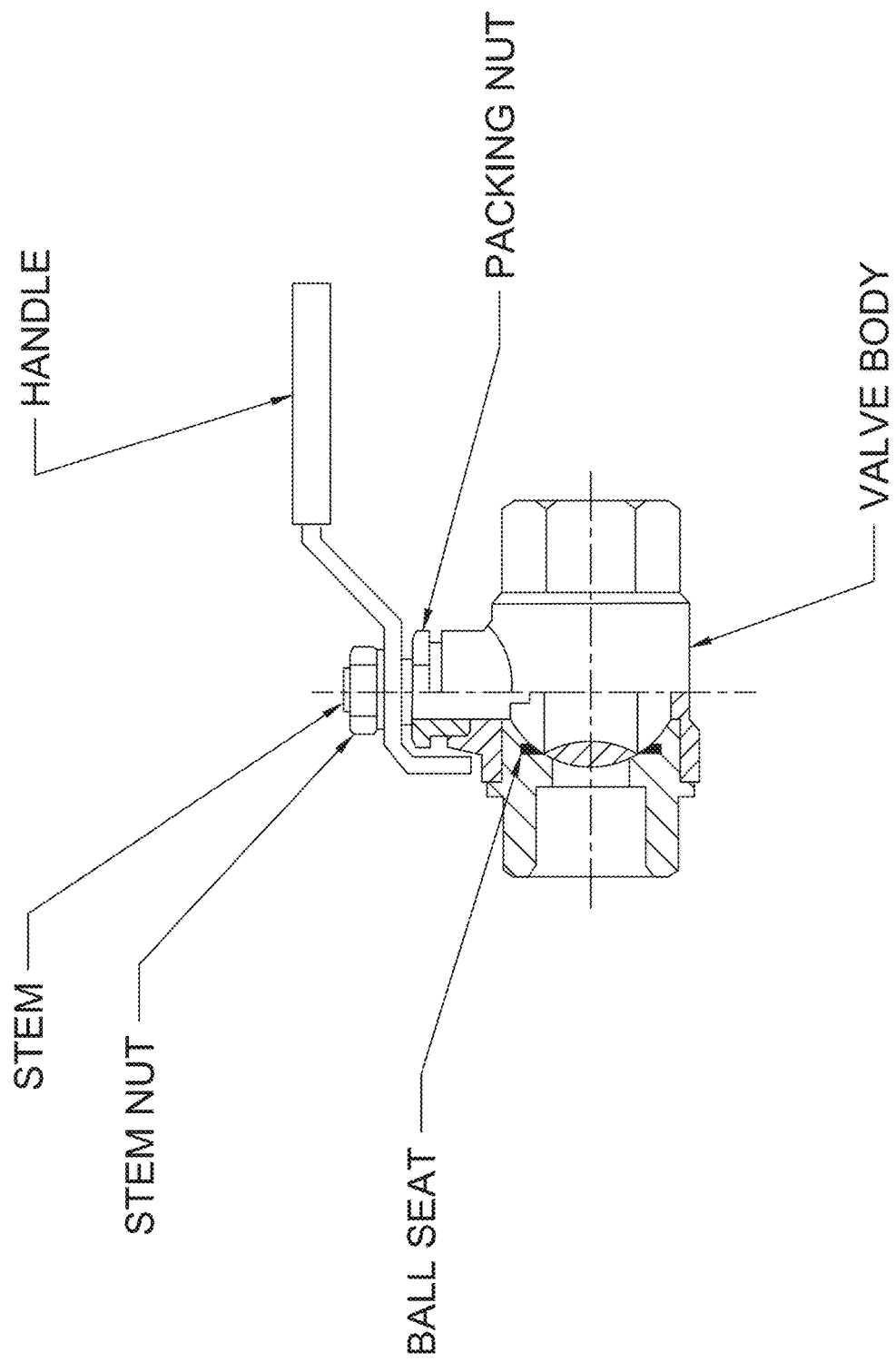
FIG. 15 is an electronic ball valve that Is used with the universal automated regulator valve of FIGS. 1, 4, and 8.

The ball valve 40 includes an inlet opening 42 on one of its sides and an outlet opening 44 on its other side. A fluid enters the ball valve 40 through the inlet opening 42 and exits the ball valve 40 through the outlet opening 44. The ball vale 40 further includes a threaded sensor mounting hole 46, a motor mounting interface 48 (shown in FIG. 1), and a floating ball (not shown). The electrical motor 50 can be attached to the ball valve 40 at the motor mounting interface using screws, threads, or bolts. The electrical motor 50 includes a shaft (not shown) which is connected to the float ball of the ball valve 40. The relay 60 is fixed over the electrical motor 50, on opposite side where the electrical motor 50 is mounted on the ball valve 40, and the power supply switch 80 is attached to a side of electrical motor 50. As a non-limiting example, the electronic actuated ball valve 30 can be an electric valve sold by BANJO Company, located in Crawfordsville, IN. Another ball valve that can be used is shown in FIG. 15. The ball valve described in Attachment A can also be used.

The electrical pressure sensor 70 includes a mounting thread 72, which may be used to install the electrical pressure sensor 70 on the ball valve 40 at the threaded sensor mounting hole 46. Furthermore, the electrical pressure sensor 70 may be set to a predetermined maximum pressure level. The fluid pressure is continuously measured by the electrical pressure sensor 70, and in the case of the fluid pressure excess from the predetermined maximum pressure level, the electrical pressure sensor 70 is incited, then the relay 60 is energized causing the electrical motor 50 to be actuated, and consequently the shaft of the electrical motor 50 turns the floating ball and the ball valve 40 is closed. As a non-exclusive example, the electrical pressure sensor 70 can be a digital pressure switch for positive pressure sold by SMC Company, located in Noblesville, IN.

Figure 3:
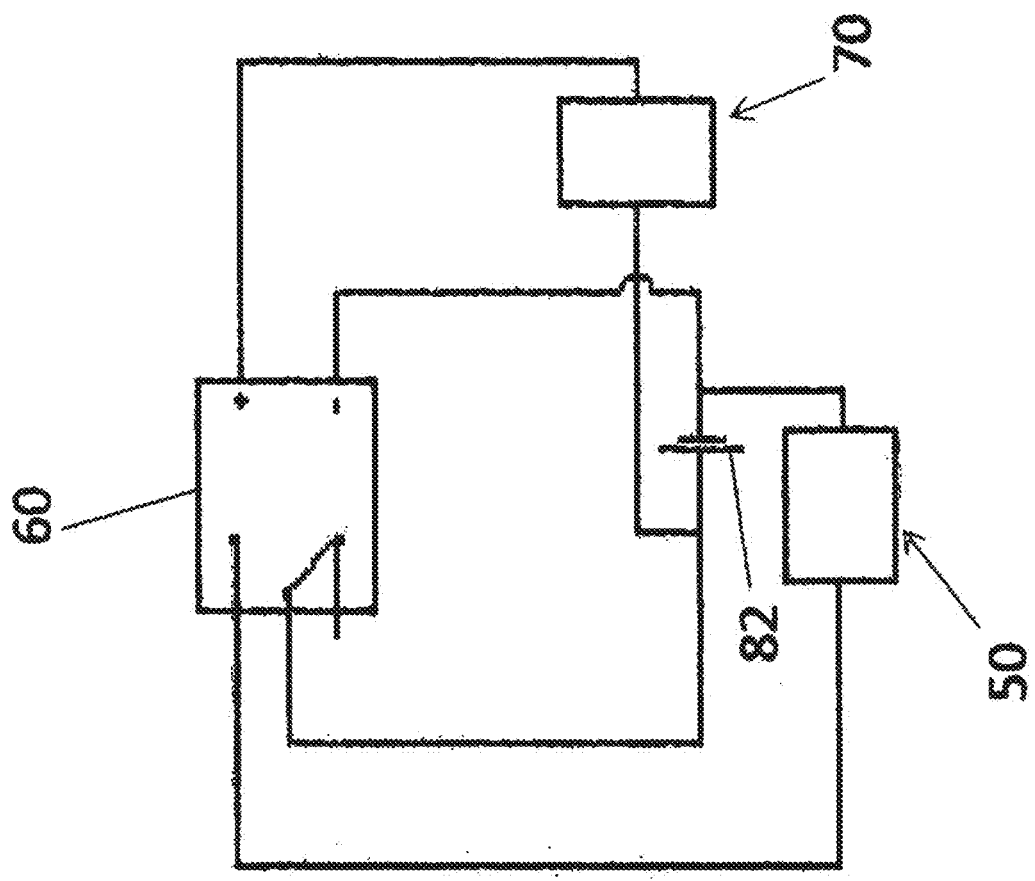
FIG. 3 illustrates an exemplary electrical wiring diagram of the device of FIG. 1.

FIG. 3 shows an exemplary wiring diagram of the universal automated regulator valve 20 shown in FIG. 1. When the fluid pressure exceeds the predetermined maximum pressure level, the electrical pressure sensor 70 closes the circuit and sends an electrical current to the relay 60. As it is illustrated in FIG. 3, initially the relay is in normally open state, however received electrical current from the electrical pressure sensor changes the state of the relay 60, and consequently electrical motor 50 is actuated. As it is illustrated in FIG. 3 a battery 82 is utilized as a source of electrical power. Alternatively, other sources of electricity such as solar batteries or electricity outlet may be used.

Figure 4:
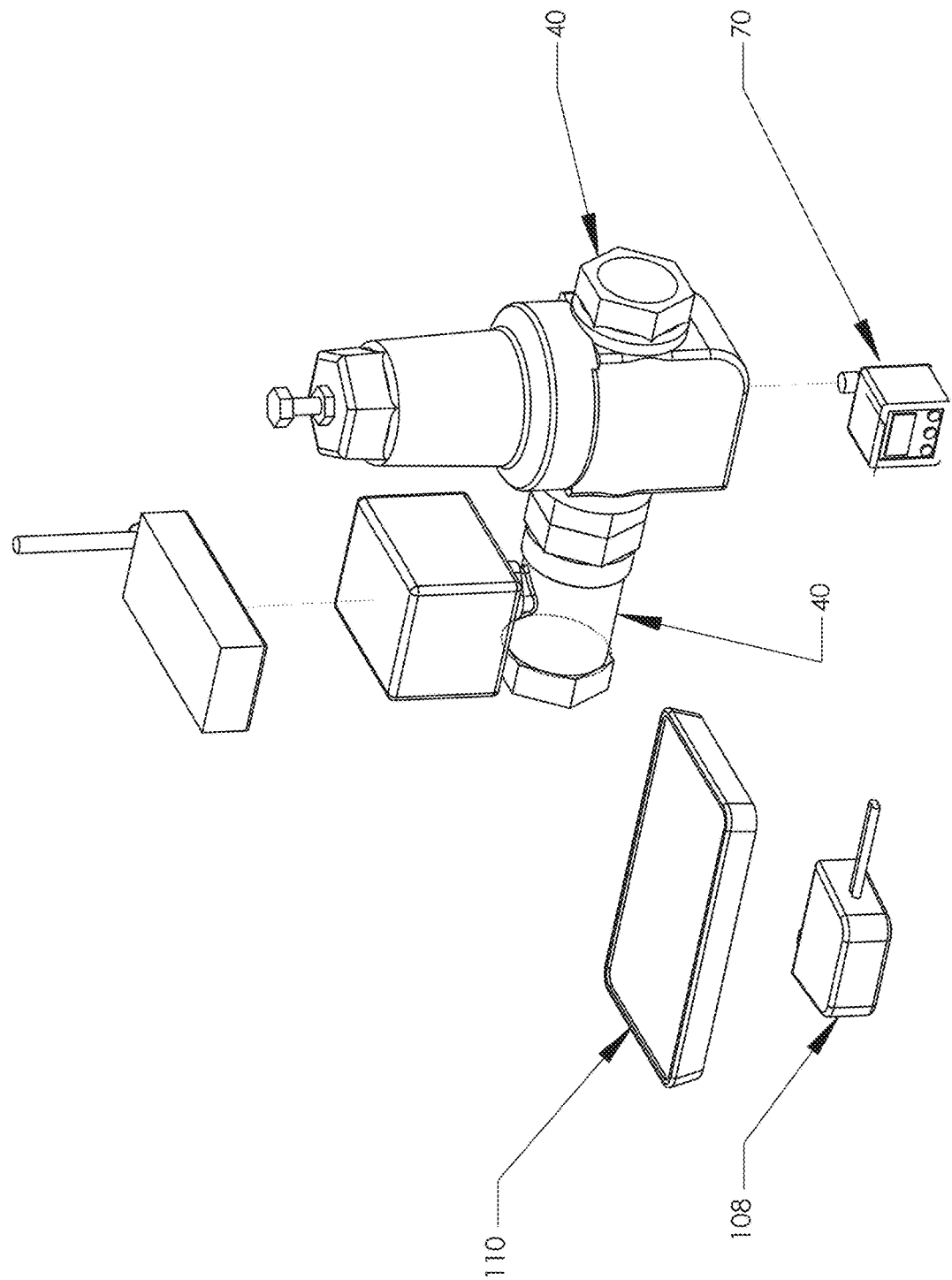
FIG. 4 illustrates another embodiment of a universal automated regulator valve.

In another embodiment as it is shown in FIG. 4, there may be inlet 90 and outlet 92 pipe nipples. The inlet pipe nipple 90 is attached to the ball valve 40 at the inlet opening 42, and accordingly the outlet pipe nipple 92 is attached to the ball valve 40 at the outlet opening 44. The inlet pipe nipple 90 may have a threaded hole (not shown), where the mounting thread (not shown in FIG. 4) of the electrical pressure sensor 70 can be installed. Therefore in this particular embodiment the pressure of the fluid in the inlet pipe nipple 90 is monitored.

Figure 5:
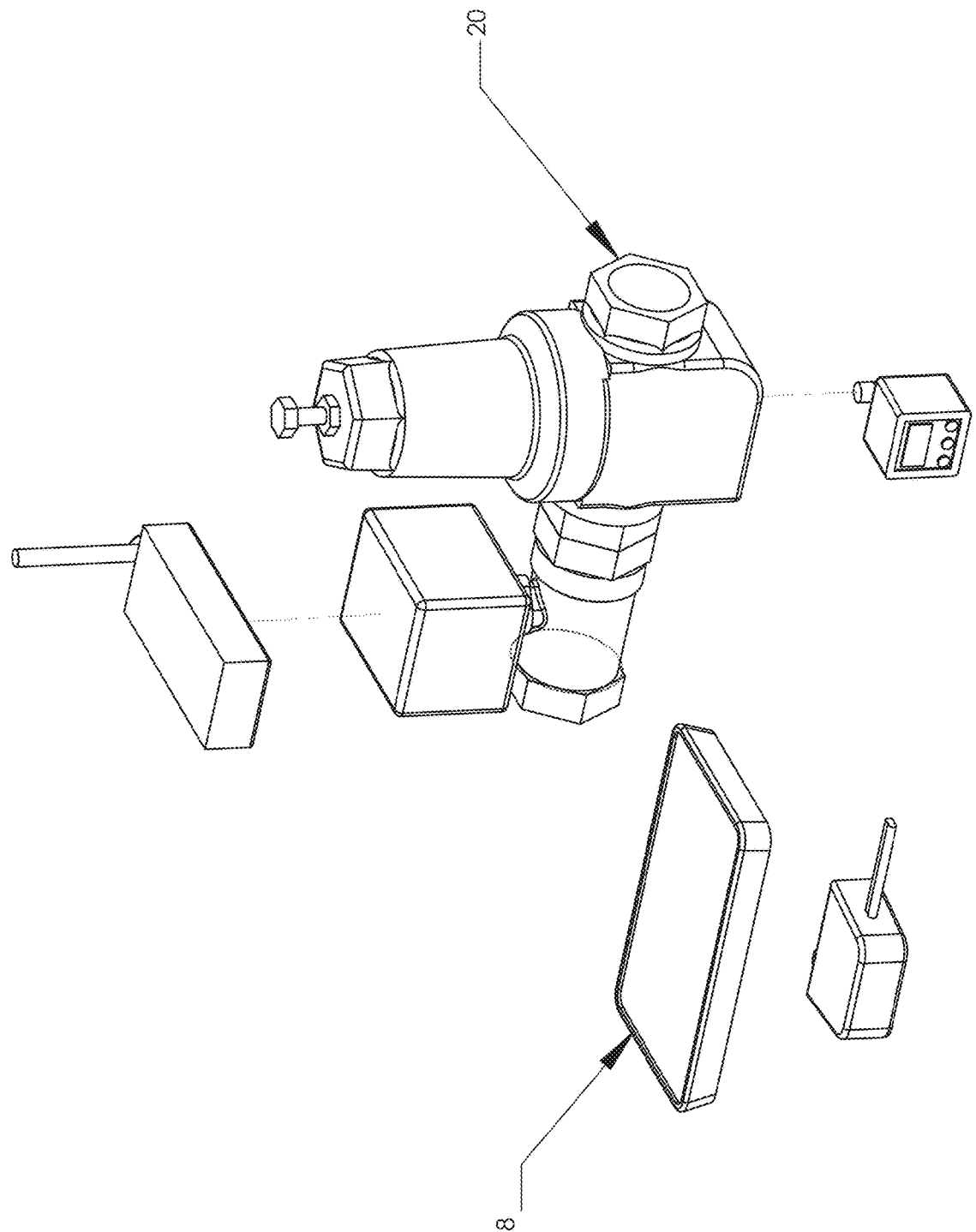
FIG. 5 illustrates universal automated regulator valve of FIG. 4 connected to a solar panel.
Figure 6:
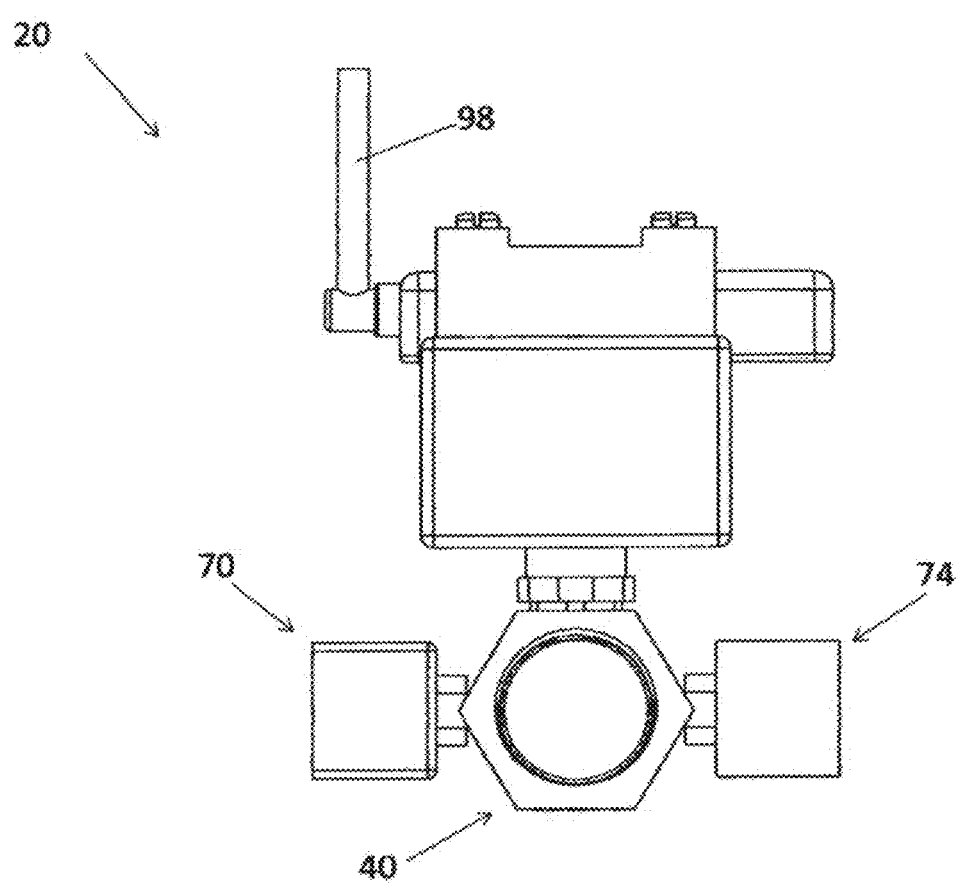
FIG. 6 illustrates another embodiment of a universal automated regulator valve with network connectivity.
Figure 7:
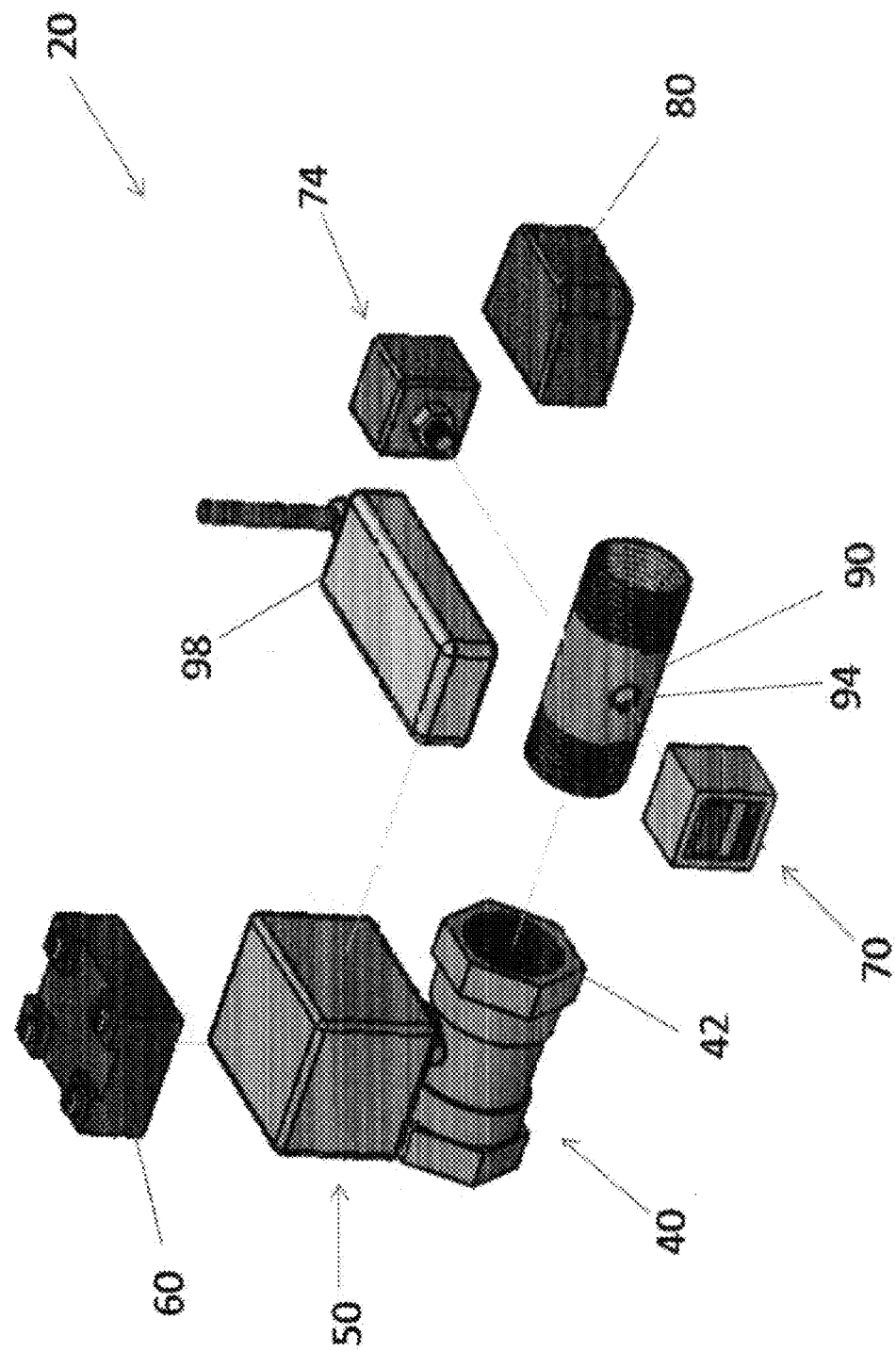
FIG. 7 is an exploded view of the device of FIG. 6.
Figure 8:
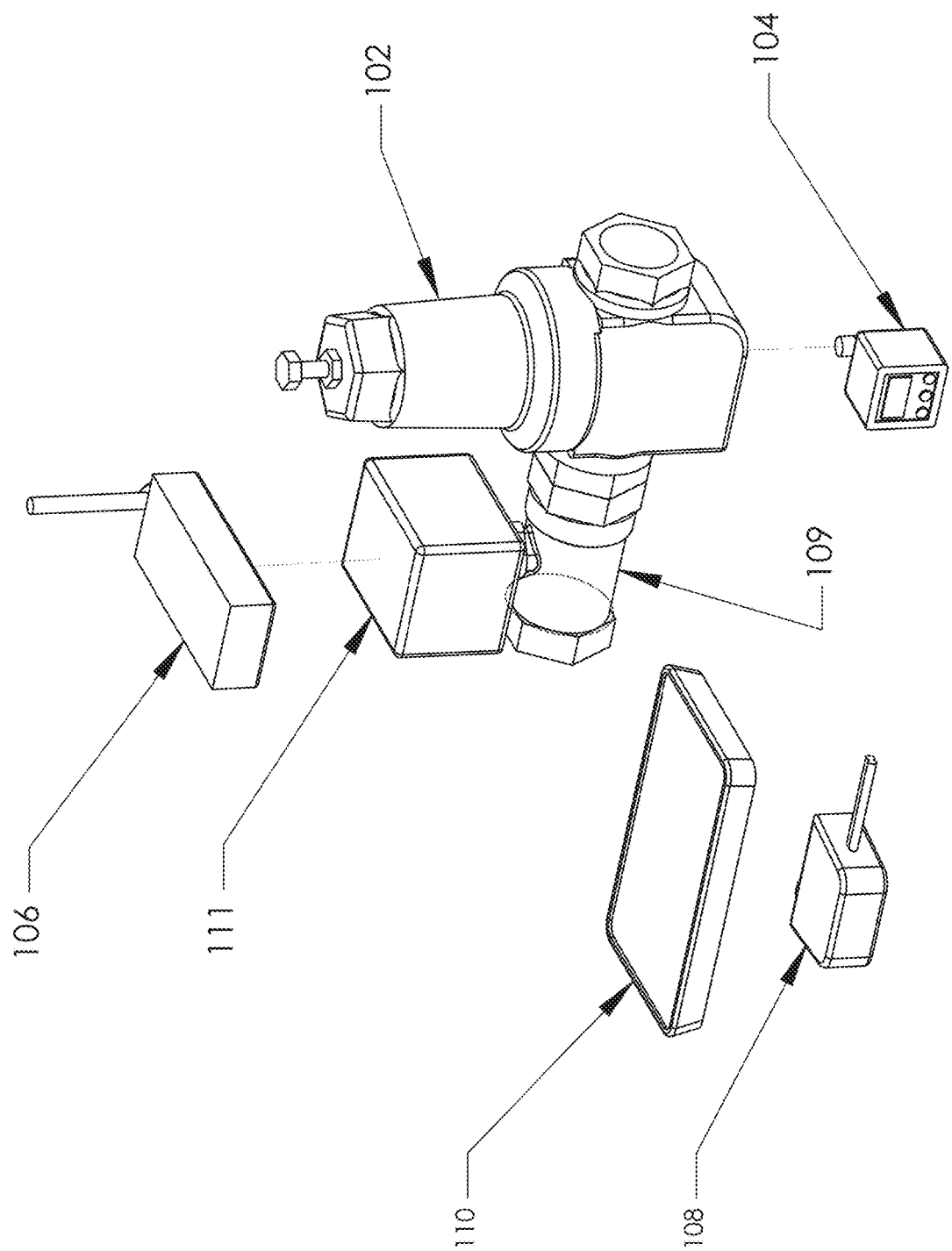
FIG. 8 is a universal automated regulator valve with a pressure regulator.
Figure 9:
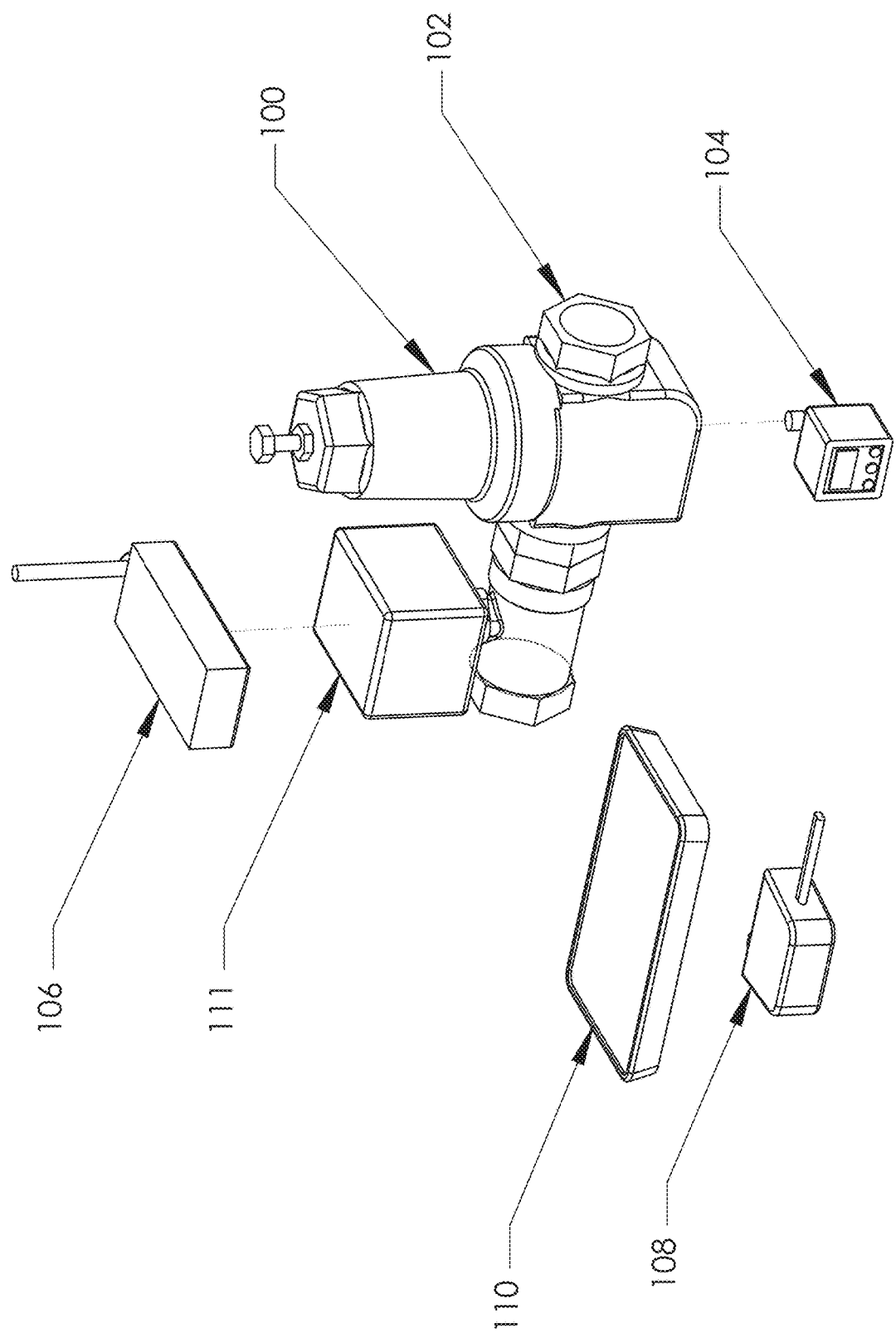
FIG. 9 is an exploded view of the universal automated regulator valve of FIG. 8.

FIG. 5 shows the universal automated regulator valve 20 connected to a solar panel 84. This embodiment may be beneficial in remote areas, where changing batteries are difficult or there is no electricity network. FIGS. 6 and 7 show a universal automated regulator valve 20 according to certain embodiments of the present disclosure. As it is shown there can be an inlet pipe nipple 90 (shown in FIG. 7), which is attached to the ball valve 40 at the inlet opening 42. The inlet pipe nipple 90 may have two threaded holes 94 (in FIG. 7 one of them is shown). The electrical pressure sensor 70 is attached to the inlet pipe nipple 90 at one of the threaded holes 94 and a flow sensor 74 is attached to the other threaded hole (not shown). In this embodiment the universal automated regulator valve 20 is controlled by both the electrical pressure sensor 70 and the flow sensor 74. Accordingly, the flow sensor 74 may be set to a predetermined maximum flow rate. Furthermore, the flow rate of the fluid in the inlet pipe nipple 90 is continuously measured by the flow sensor 74, and whenever the flow rate exceeds the predetermined maximum flow rate, the flow sensor 74 is incited, and consequently the ball valve 40 is closed. Alternatively, various types of sensors such as but not limited to pressure sensors, flow sensors, timers, vacuum sensors, temperature sensors, or any combination of them may be used to control the universal automated regulator valve 20.

Wireless control and monitoring may be performed using communications device that adopt any of a number of well-known protocols, such as through a Bluetooth connection or Wi-Fi connection over a local or wide area network, such as the internet. As shown in FIGS. 6 and 7, the universal automated regulator valve further includes a Wi-Fi Bluetooth control unit Pinoccio as a reference others can be used, connection 98 enabling remote monitoring and control of the device.

Referring now to FIGS. 8-11, an embodiment of a universal automated regulator valve 100 with a pressure regulator 102 is shown. The pressure regulator 102 can be a pressure retaining valve, a pressure reducing valve, a single stage pressure regulator, a dual stage pressure regulator, or other pressure regulators known in the art. A pressure and flow sensor 104 is attached to the pressure regulator 102. The universal automated regulator valve 100 further includes a power supply 108, a solar panel 110, a ball valve 109, a ball valve controller 111, a solar panel 110, and a communications device 106, such as a Wi-Fi connection. Other than the pressure regulator 102, all of these components are the same as those described above and shown in FIGS. 1-6. The power supply 108 and solar panel 110 powers the communications device and may also power the pressure and flow sensor 104. The solar panel 110 becomes the main source of power in the absence of power connection to the electrical grid. The communications such as a "Pinoccio" device 106 is connected to the pressure and flow sensor 104 and the ball valve controller 111, and allows for the remote monitoring and control of the pressure and flow parameters of the universal automated regulator valve 100. Other communications device such as Bluetooth may also be used. The communications device 106 may also be connected to the pressure regulator 102 to adjust the set pressure or the predetermined pressure that the pressure regulator 102 needs to maintain.

Figures 12, 13:
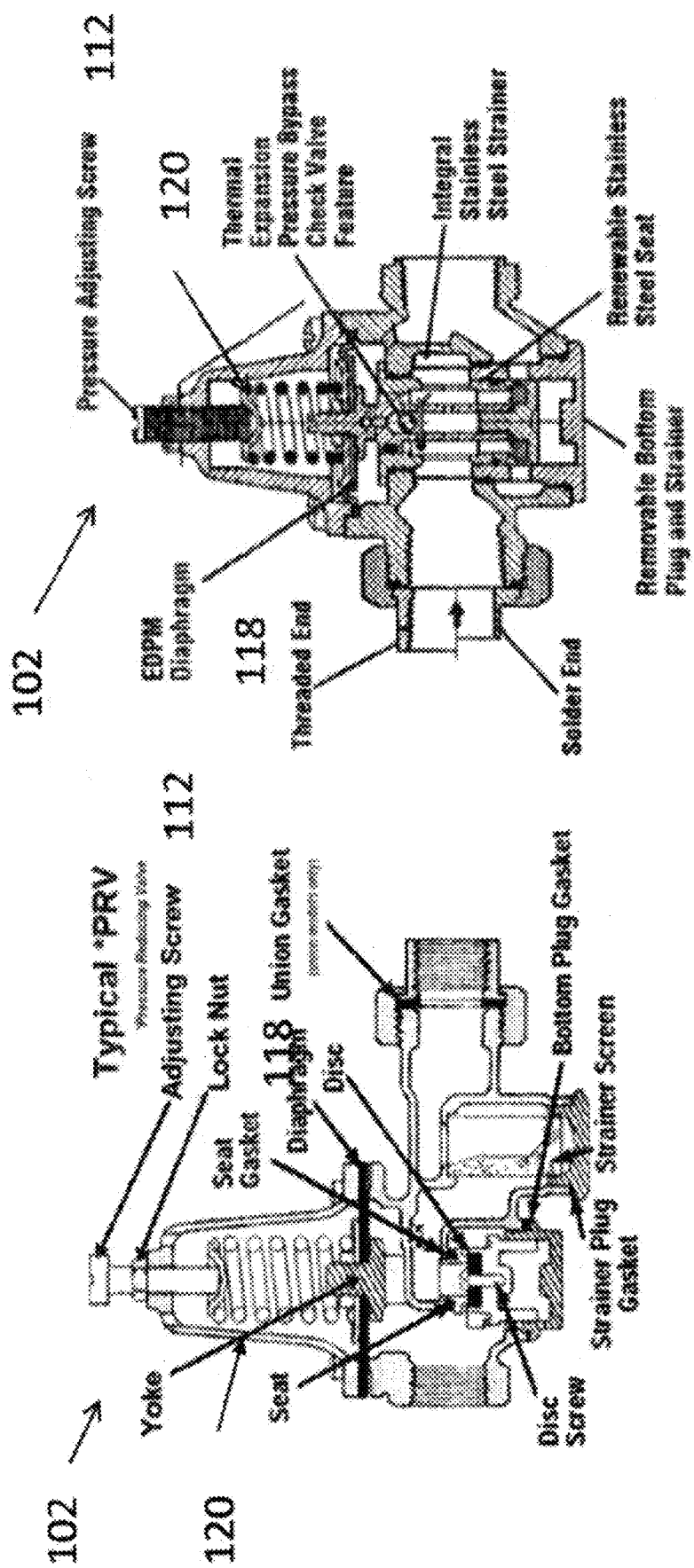
FIG. 12 is an embodiment of a pressure regulator that is used with the universal automated regulator valve of FIG. 8.
FIG. 13 is another pressure regulator that is used with the universal automated regulator valve of FIG. 8.
Figure 14:
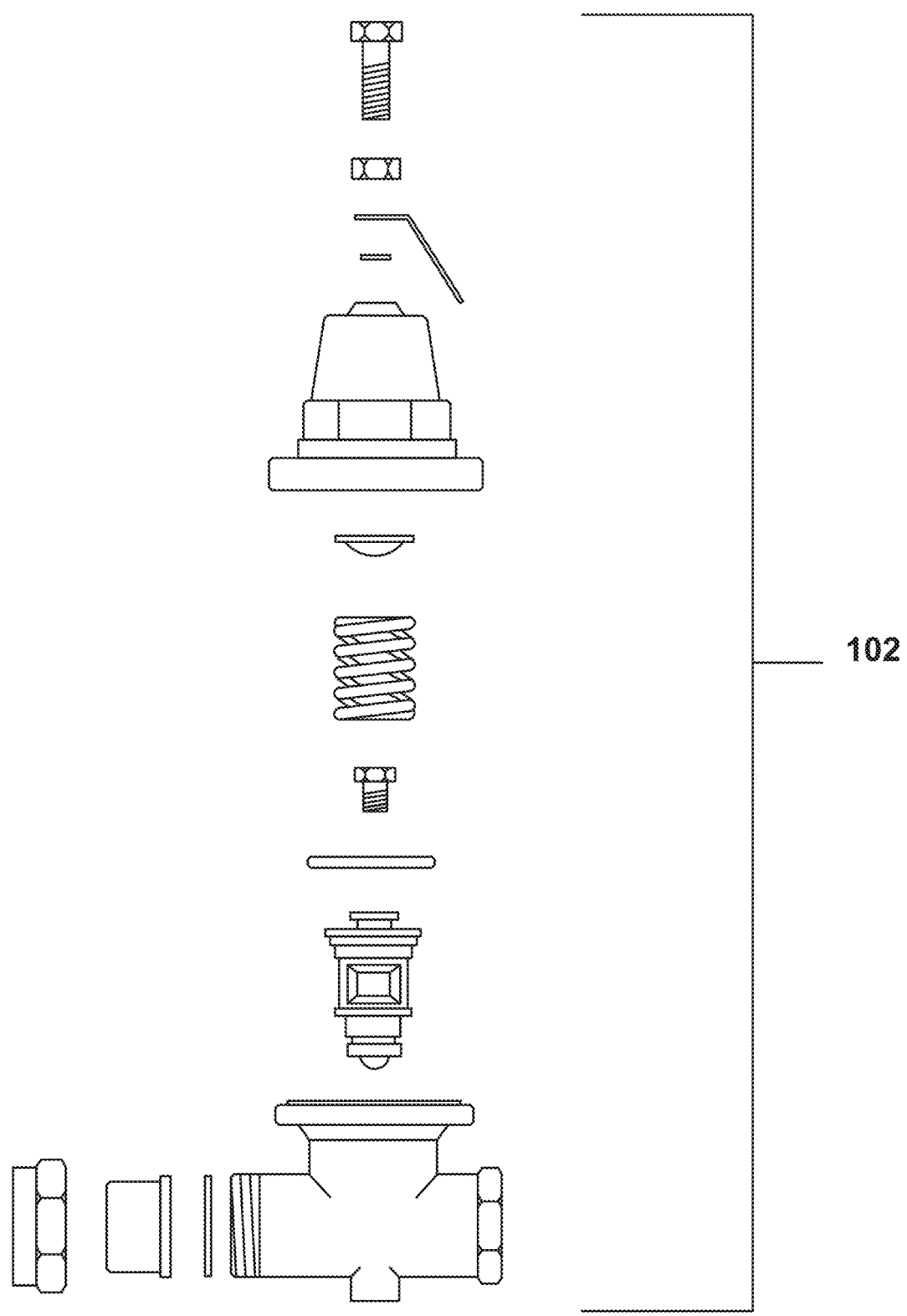
FIG. 14 is another pressure regulator that is used with the universal automated regulator valve of FIG. 8.

Referring now to FIGS. 12-14, some examples of pressure regulators 102 that may be used are shown. Another pressure regulator that may be used is Type 75A Water Pressure Regulator from Emerson Process Management Regulator Technologies, Inc. of Mckinney, Texas, as described in Attachment B. In general, the pressure regulator includes an adjusting screw 112 to adjust the set pressure, which is the desired pressure to be maintained. The set pressure can be low pressure or high pressure, as desired. The pressure regulator further includes input medium channels and output medium channels. If the input pressure in the input medium channel exceeds the set pressure, the medium is diverted over the valve channels that lead to the diaphragm 118. The diaphragm compresses upwards together with the piston 120, thereby causing the pressure regulator to open the output medium channel to vent the excess pressure. The pressure regulator then closes the output medium channel once the set pressure is attained. The pressure regulator opens and closes the output medium channels to achieve a constant system pressure. It is noted that the pressure regulator 102 is not limited to regulating any particular kind of medium. The pressure regulator 102 can regulate the pressure of water, gas, or any other medium.

In use, the universal automated regulator valve 100 is self-monitoring and self-regulating. It monitors discrepancies in the pressure or flow rate and it can adjust the pressure or low rate to maintain a set pressure or flow rate. It is connected to the electronic ball valve so that when the pressure or flow rate discrepancy exceeds a threshold, the electronic ball valve is configured to shut down automatically. Their communication devices, such as their Wi-Fi controllers, allow users to monitor and control them remotely using their computers or mobile devices. Their flow meters allow users to monitor consumption of gas or water, depending on the user's application.

Figure 16:
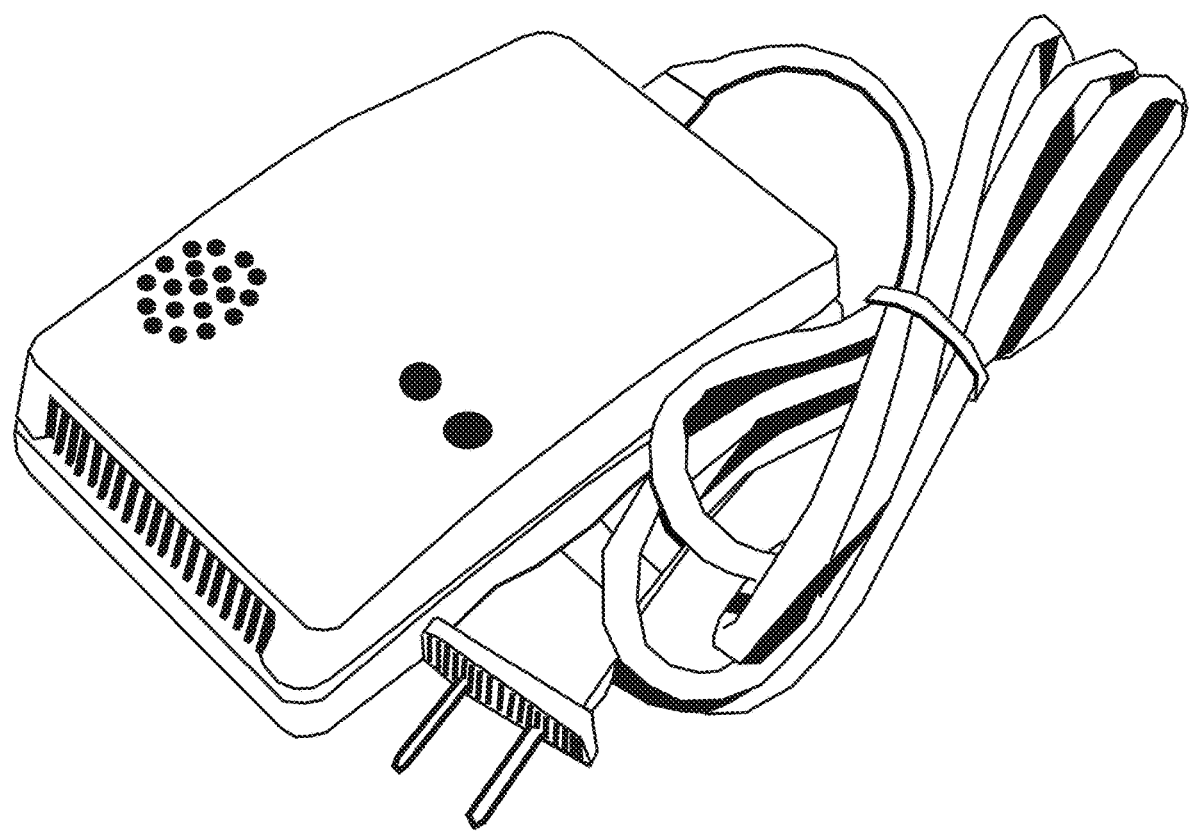
FIG. 16 is a gas sensor that can be used with the universal automated regulator valve of FIGS. 1, 4, and 8.

The universal automated regulator valve of the present disclosure may be used in water and gas lines in residential or commercial settings. Several wired or wireless gas or water leak sensors may be positioned along the gas or water lines and connected to the universal automated regulator valve, such as to ball valve controller. When the gas or water leak sensor senses a leak of a predefined pressure, flow, temperature the ball valve controller causes the ball valve to shut off flow to the system. The Pinoccio controller also has electronic seismic sensor so the automated regulation unit for gas, propane, etc. works as an earthquake emergency shut off valve also. An example of a gas sensor is BESTEK® Plug-In Combustible Gas Detector Alarm Sensor Natural Gas Leak Sensor Detector Alarm with Voice Warning and LED Indicator, which is shown in FIG. 16.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A digital automated regulation device for a pipeline with fluid, comprising:
    digital regulation device controller coupled to an electronic actuated ball valve, an electric motor and a relay;
    a plurality of fluid leak sensors coupled to the digital regulation device controller and located along an outside of the pipeline and configured to measure fluid leaks along the pipeline;
    a temperature sensor coupled to the digital regulation device controller configured to measure a temperature of the fluid in the pipeline at a predetermined time;
    a pressure sensor coupled to the digital regulation device controller and having an electrical pressure sensor switch, wherein the pressure sensor is configured to measure a pressure of the fluid in the pipeline at a predetermined time;
    a flow-rate sensor coupled to the digital regulation device controller configured to measure a flow rate of the fluid at a predetermined time;
    an automated regulator coupled to the digital regulation device controller, the electrical motor, the relay, and the electrical pressure sensor switch, wherein the universal automated regulator is configured to monitor discrepancies in the pressure and the flow rate of the fluid;
    at least one electronic actuated ball valve being electronically controlled by the automated regulator and configured to automatically regulate the pressure and flow rate of the fluid in the pipeline by actuating the electrical motor to open or close the electronic actuated ball valve with the relay based on the monitored discrepancies of the pressure or flow rate of the fluid in the pipeline that exceed a predetermined set threshold value; and
    wherein the automated regulator automatically closes the electronic actuated ball valve when at least one of the plurality of fluid leak sensors senses a leak of a predefined pressure, flow, or temperature of the fluid in the pipeline and wherein at least one of the plurality of fluid leak sensors is a wireless leak sensor;
    a battery utilized as a source of electrical power;
    an electronic seismic sensor configured so that the automated regulator works as an earthquake emergency shut off valve;
    inlet and outlet pipe nipples, wherein the inlet pipe nipple is attached to the electronic actuated ball valve at an inlet opening of the electronic actuated ball valve, and the outlet pipe nipple is attached to an outlet opening of the electronic actuated ball valve, wherein the inlet pipe nipple has a threaded hole for installation of a mounting thread of the pressure sensor; and
    wherein the relay is fixed over the electrical motor, on opposite side where the electrical motor is mounted on the electronic actuated ball valve.

2. The digital automated regulation device for a pipeline with fluid of claim 1, wherein the plurality of fluid leak sensors includes a sensor attached to the outside of the pipeline.

* * * * *